United States Patent Office 3,242,129
Patented Mar. 22, 1966

3,242,129
CARBOXY TERMINATED POLYMERS AS PROCESSING AIDS FOR POLYBUTADIENE
Charles R. Wilder, Bartlesville, Okla., assignor to Phillips Petroleum Company, a corporation of Delaware
No Drawing. Filed Mar. 11, 1963, Ser. No. 264,071
4 Claims. (Cl. 260—31.8)

This invention relates to polybutadiene compositions having improved processing characteristics. In one aspect, the invention relates to a method for improving the processability of certain polybutadiences. In another aspect, the invention relates to a polymer composition containing a major amount of a polybutadiene and a minor amount of a carboxy-terminated liquid polybutadiene.

In recent years a great deal of work has been done toward the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has also aroused considerable interest. The polymers formed by the use of these catalysts often have outstanding physical properties which render them equal to or even superior to natural rubber. A particularly outstanding product obtained by the use of certain stereospecific catalysts is a polybutadiene containing at least 85 percent cis 1,4-addition. Another product that has achieved importance in the rubber industry is a polybutadiene prepared with a lithium based catalyst.

Because of its outstanding physical properties, high cis-polybutadiene has many important applications. It is particularly suitable for use as a substitute for natural rubber in the fabrication of heavy duty tires for automotive vehicles. It has been found to be critical that the polybutadiene contain at least 85 percent cis 1,4-addition, for otherwise the polymer does not possess the outstanding physical properties which distinguish it from other polybutadienes. It has also been discovered that as the cis-content of the polybutadiene increases above 85 percent, the polymer exhibits generally improved properties. However, while polybutadienes having a cis-content above 85 percent, e.g., from 90 to 98 percent and higher, exhibit improved properties over a polymer having a slightly lower cis-content, polymers having such high cis-contents are often difficult to process. Polybutadienes prepared with a lithium based catalyst also have physical properties of such a nature that they are particularly suitable for the fabrication of automobile and truck tires. However, these polymers are likewise often difficult to process. It is essential that a polymer be processable, for otherwise its use is seriously limited.

It is an object of this invention, therefore, to provide a polybutadiene composition having improved processing characteristics.

Another object of the invention is to provide a method for improving the processability of a high cis-polybutadiene or a polybutadiene prepared with a lithium based catalyst.

Other and further objects and advantages of the invention will become apparent to those skilled in the art upon consideration of the accompanying disclosure.

In accordance with the present invention, it has now been discovered that the processability of a cis-polybutadiene or a polybutadiene prepared with a lithium based catalyst can be greatly improved if a minor amount of a carboxy-terminated liquid polybutadiene is blended with a major amount of the polybutadiene. While the present invention is particularly applicable to polybutadienes containing in the range of 90 to 98 percent and higher of cis 1,4-addition, it is to be understood that improvement in the processability of polybutadienes containing lower percentages, e.g., from 35 to 48 or from 85 to 90 percent, of cis 1,4-addition can be obtained by proceeding in accordance with the present invention. It was completely unexpected when it was found that the processability of the polybutadienes could be greatly improved by the incorporation of small amounts of a carboxy-terminated liquid polybutadiene since liquid polybutadiene per se is ineffective as a processing aid for the polybutadienes.

Broadly speaking, the rubbery composition of this invention comprises (1) a major amount of (a) a cis-polybutadiene or (b) a polybutadiene prepared with a lithium based catalyst and (2) a minor amount of a carboxy-terminated liquid polybutadiene. The liquid polybutadiene generally has a carboxyl content in the range of 0.5 to 5 weight percent. The amount of the carboxy-terminated liquid polybutadiene employed in the composition is usually in the range of 0.5 to 10.0 parts per 100 parts of cis-polybutadiene or polybutadiene prepared with a lithium based catalyst. It is within the scope of the invention to employ blends of the carboxy-terminated liquid polybutadiene and a non-functional liquid polybutadiene as the processing aid as long as the blend has a carboxyl content in the aforementioned range. A non-functional liquid polybutadiene is a polymer that does not have reactive end groups.

The composition of this invention can be prepared in a variety of ways, but the preferred method for admixing the polybutadiene with the carboxy-terminated liquid polybutadiene is with mechanical mixers, such as roll mills or Banbury mixers. Temperatures employed during the mixing cycle are usually in the range of 40 to 400° F., preferably from 60 to 350° F. The mixing time necessary for obtaining a homogeneous blend varies with the size of the batch, efficiency of the mechanical action, and the like. A mixing time in the range of 0.5 to 20 minutes, preferably from 1 to 10 minutes, has generally been found to be satisfactory when using a mechanical mixer. It is also within the scope of the invention to blend solutions of the polymers. When using the solution blending technique, the time will vary with the type of equipment employed. For example, when using large blending tanks, sufficient time to obtain adequate mixing is required. The actual mixing time will depend upon the size of the tank, but will generally not exceed one hour. If a mixing T or pump is used, the mixing is substantially instantaneous. Temperature and pressure conditions used in solution blending will vary with the hydrocarbon solvent used but, in general, are such as to maintain the solvent in liquid phase. The polymer blend is then recovered by removing the solvent by any suitable method such as by steam stripping or by coagulation with an alcohol. The resulting blend obtained by these operations can be compounded and vulcanized by well-known rubber vulcanization recipes. Vulcanization accelerators, vulcanizing agents, reinforcing agents, and fillers such as have been used in compounding natural and synthetic rubbers can be used when compounding the composition of this invention. The rubbery composition produced has utility in applications where natural and synthetic rubbers are used. The composition can be used in the manufacture of automobile and truck tires and other rubber articles, such as gaskets.

The cis-polybutadiene can be prepared by polymerizing 1,3-butadiene with any one of a large number of stereo-specific catalyst systems. It is usually preferred to employ a catalyst which is selected from the group consisting of (1) a catalyst comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst comprising an organometal compound having the formula $R_nM'$, wherein R is an organo radical as defined above, M′ is aluminum, magnesium, lead, sodium or potassium, and $n$ is equal to the valence of the metal M′, titanium tetrachloride and titanium tetraiodide, (3) a catalyst comprising an organometal compound having the formula $R_aM''$, wherein R is an organo radical as defined above, M″ is aluminum or magnesium and $a$ is equal to the valence of the metal M″, a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M‴ is aluminum, gallium, indium or thallium, and $x$ is equal to the valence of the metal M‴, a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic and bismuth, and $c$ is an integer from 2 to 5, inclusive, and (5) a catalyst comprising an organo compound having the formula $R_xM'''$, wherein R, M‴ and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride, and tin tetraiodide; triethyl-gallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

The present invention is also applicable to the treatment of a polybutadiene prepared by polymerizing 1,3-butadiene with lithium metal and/or an organolithium compound. The polybutadienes prepared with a lithium based catalyst generally contains from 35 to 48 percent cis 1,4-addition, from 45 to 55 percent trans 1,4-addition, and from 6 to 10 percent 1,2-addition. The present invention is particularly applicable to low inert viscosity polybutadienes prepared by this method. Such polymers generally have an inherent viscosity in the range of 0.75 to 3. While the low inherent viscosity polybutadienes possess outstanding properties, they are often difficult to process.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, and the like. Examples of other organolithium compounds that can be used are set forth hereinafter in the discussion of catalysts suitable for use in preparing the liquid polybutadiene.

The process used in preparing polybutadiene with a lithium based catalyst can be conducted at a temperature in the range of −100 to 250° F., preferably at a temperature in the range of 0 to 180° F. The polymerization reaction can be carried out under autogenous pressures. It is usually desirable to operate at a pressure sufficient to maintain the reaction mixture in the liquid phase. The polymerization is conducted in the presence of a hydrocarbon diluent similar to that employed in the cis-polybutadiene polymerization process as described hereinbefore. The actual pressure used in the process will depend upon the particular diluent employed and the temperature at which the polymerization is to be conducted.

A polybutadiene having a desired inherent viscosity can be readily prepared by varying the concentration of the organolithium compound. For example, with a completely dry system and no other impurities present to destroy the organolithium compound, about 2.5 millimoles of catalyst per 100 grams of monomer is generally required to give a polymer having an inherent viscosity of 0.75, and about 0.30 millimole of catalyst per 100 grams of monomer is generally required for the production of a polymer having an inherent viscosity of 3.0. It has been found that for practical operations approximately 0.3 mhm or more of catalyst is needed as a scavenger for the system.

Upon completion of the polymerization reaction, the polymerization mixture is then treated to inactivate the catalyst and recover the rubbery polymer, i.e., the cis-polybutadiene or the polybutadiene prepared with a lithium based catalyst. A suitable method for accomplishing this result involves steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 4,4′-methylene-bis(2,6-di-tert butylphenol) to the polymer solution prior to recovery of the polymer. In accordance with the present invention, the polymer so recovered is then blended with a minor amount of a carboxy-terminated liquid polybutadiene, thereby improving its processability. When using a solution blending technique to prepare the blend, it is often prepared to blend the polymer solution as it is recovered from the polymerization with a solution of the carboxy-terminated liquid polybutadiene. An amount of a shortstopping agent, such as an alcohol or a rosin acid, sufficient to inactivate the catalyst, but insufficient to precipitate polymer, is added to the polymer solution prior to the blending operation.

The carboxy-terminated liquid polybutadiene is prepared by carbonating a liquid polybutadiene produced by polymerizing 1,3-butadiene with an organo alkali metal catalyst. Any suitable method can be used for carbonating the liquid polybutadiene. Such methods include those which involve contacting a solution of the polymer with carbon dioxide, either by bubbling carbon dioxide through the solution or by pouring the solution over Dry Ice. A preferred method for carbonating the liquid polybutadiene is described by James N. Short in copending application, U.S. Serial No. 50,310, filed August 18, 1960. According to the method described in this application, a solution of polymer having at least one terminal alkali metal atom is contacted with gaseous carbon dioxide under conditions of turbulent flow whereby there occurs instantaneous mixing between the carbon dioxide and the polymer solution. The resulting product is then treated to remove the alkali metal atoms from the polymer and leave the carboxy end groups.

As mentioned above, the liquid polybutadiene is prepared by contacting 1,3-butadiene with an organo alkali metal compound. While compounds containing only one alkali metal atom per molecule, such as n-butyllithium, are suitable and will produce mono-terminally reactive polymer, i.e., polymer containing a reactive group on only one end of the polymer chain, it is preferred that an organo polyalkali metal compound be employed, e.g., a compound containing 2 to 4 alkali metal atoms. Catalysts counting two alkali metal atoms per molecule are usually preferred, and lithium is the preferred alkali metal.

The organo polyalkali metal compounds used as polymerization catalysts can be prepared by several methods. For example, they can be prepared by replacing halogens in an organic halide with alkali metals, by direct addition of alkali metals to a double bond, or by reacting an organic halide with a suitable alkali metal compound. The organo polyalkali metal compound initiates the polymerization reaction, the organo radical being incorporated in the polymer chain and the alkali metal atoms being attached at each end of the polymer chain. The polymers generally will be linear polymers having two ends, but polymers containing more than two ends can also be prepared.

Although organo compounds of the various alkali metals can be utilized in preparing the liquid polybutadiene, it is preferred to employ an organolithium catalyst. It has been found that these compounds give very high conversions to the terminally reactive polybutadiene. With organo compounds of the other alkali metals, the amount of mono-terminally reactive polymer, i.e., polymer having alkali metal at only one end of the chain, is substantially higher. The alkali metals include sodium, potassium, rubidium and cesium. The organic radical of the organo polyalkali metal compound can be an aliphatic, cycloaliphatic or aromatic radical. For example, di- and polyalkali metal substituted hydrocarbons can be employed including 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4′-dilithiobiphenyl, disodiophenanthrene, dilithioanthracene, 1,2-dilithio-1,1-diphenylethane, 1,2-disodio-1,2,3-triphenylpropane, 1,2-dilithio-1,2-diphenylethane, 1,2-dipotassiotriphenylethane, 1,2 - dilithiotetraphenylethane, 1,2 - dilithio - 1 - phenyl - 1 - naphthylethane, 1,2 - dilithio - 1,2 - dinaphthylethane, 1,2 - disodio - 1,1 - diphenyl - 2 - naphthylethane, 1,2 - dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithio-4-methylphenyl)butane, 1,2-dipotassio-3-phenylpropane, 1,2-di(4-lithiobutyl)benzene, 1,3-dilithio-4-ethylbenzene, 1,4-dirubidiobutane, 1,8-dicesiooctane, 1,5,12-trilithiododecane, 1,4,7-trisodioheptane, 1,4-di(1,2-dilithio-2-phenylethyl)benzene, 1,2,7,8-tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithio-triphenylethane, dilithiomethane, 1,4-dilithio-1,1,4,4-tetraphenylbutane, 1,4-dilithio-1,4-diphenyl-1,4-dinaphthylbutane, and the like.

While the organo dialkali metal initiators in general can be employed, certain specific initiators give better results than others and are preferred in carrying out the preparation of the terminally reactive polymers. For example, of the condensed ring aromatic compounds, the lithium adducts of naphthalene, methylnaphthalenes, or anthracene are preferred, but the adducts of lithium and biphenyl can be employed with good results. Of the compounds of alkali metals with polyaryl-substituted ethylenes, the preferred material is 1,2-dilithio-1,2-diphenylethane (lithium-stilbene adduct). In many instances, the compounds which are formed are mixtures of mono- and dialkali metal compounds, which are less effective in promoting the formation of the terminally reactive polymers. The organo dialkali metal compounds, which have been set forth as being preferred, are those which when prepared contain a minimum of the mono-alkali metal compound. Another preferred catalyst which provides several advantages is the dilithium adduct of 2,3-dimethyl-1,3-butadiene which contains 1 to 7 dimethylbutadiene units. Still another preferred catalyst is a lithium-methyl naphthalene-isoprene-butadiene adduct.

The amount of the catalyst employed is that which will result in the formation of a liquid polybutadiene. The liquid polybutadienes generally have a molecular weight in the approximate range of 1000 to 20,000. In obtaining a polybutadiene having a molecular weight in this range, from about 5 to about 100 millimoles of catalyst per 100 grams of 1,3-butadiene is usually employed. It is generally preferred to use from about 20 to about 40 millimoles of catalyst per 100 grams of monomer. It is to be understood that in the preparation of a rubbery polybutadiene with a lithium based catalyst as described hereinabove, smaller amounts of the catalyst are employed. With an organolithium catalyst, the molecular weight of the polymer can be readily determined from the weight of the monomer and the catalyst level employed. Thus, assuming 100 percent conversion, the molecule weight of the polymer can be calculated by dividing the weight of monomer by the catalyst level expressed in mols.

The process for preparing the terminally reactive polybutadiene is generally conducted at a temperature in the range of −150 to 300° F., preferably between −100 and 170° F. The temperature actually employed depends to a great extent upon the particular catalyst system used in preparing the polymer. Thus, it has been found that the organolithium catalyst provides more favorable results at elevated temperatures whereas with other alkali metal compounds, lower temperatures are required to effectively initiate polymerization. It is preferred to carry out the polymerization in the presence of a suitable hydrocarbon diluent, e.g., paraffins, cycloparaffins and aromatics containing from 4 to 10 carbon atoms per molecule. Examples of diluents that can be used include benzene, toluene, xylene, n-butane, n-hexane, n-heptane, isooctane, cyclohexane, methylcyclohexane and the like.

In preparing the carboxy-terminated liquid polybutadiene, the polymer solution obtained in the polymerization can be reacted directly with carbon dioxide. As previously mentioned, it is preferred to contact the solution with gaseous carbon dioxide under conditions of turbulent flow. The conditions of turbulent flow and intimate mixing can be provided by passing the polymer solution and the gaseous carbon dioxide into separate legs of a T-shaped reaction tube and withdrawing the carbonated polymer mixture through the third leg of the tube. It is often desirable to dilute or concentrate the solution in order to obtain the best viscosity conditions for the carbonation step. Solutions containing at least about 3 weight percent polymer are usually used, but the concentration of the polymer in solution ordinarily does not exceed 20 weight percent. The reaction mixture should be withdrawn from the zone of turbulence within about 5 seconds after the initial contacting, and the residence time of polymer in the mixer is preferably less than about 2 seconds. The carbon dioxide should be used in excess, e.g., at least twice the amount required for stoichiometric carbonation of the polymer. Carbon dioxide is introduced under pressure, e.g., from about 10 to about 100 p.s.i.g. and the mixing T is vented to a lower pressure, preferably to the atmosphere. Since moisture causes the alkali metal on the polymer ends to be replaced with hydrogen, the carbon dioxide should be dry.

The temperature of the carbonation reaction is usually maintained below 60° F., preferably at about 30° F. or below. This temperature is best obtained by cooling the polymer solution to about −60° F. to 60° F. before introducing it into the mixing T. Since the alkali metal salt of the carboxy-terminated polymer is normally insoluble in the polymerization mixture, the carbonated polymer mixture issues from the mixing T in the form of a dispersion of very finely divided gel. This dispersion can be readily handled by pumps and can be transferred through piping to storage facilities.

The final step in preparing the carboxy-terminated liquid polybutadiene is to treat the alkali metal salt with a suitable reagent, such as an acid, in order to convert the metal salt groups to carboxy groups. Any material containing an active hydrogen more reactive than the hydrogen of the carboxy group can be used for this replacement. Generally, a dilute inorganic acid such as hydrochloric, phosphoric, or sulfuric acid is most suitable. The acid conversion step can follow the carbonation step immediately or it can be delayed for several hours while the polymer is stored in its gelled salt form. After acidification the polymer redissolves and is separated from the hydrocarbon solvent by conventional techniques. The carboxy-terminated liquid polybutadiene so prepared can then be employed in the practice of the present invention. For additional details regarding the preparation of the carboxy-terminated polybutadiene, reference may be had to the above-cited copending application.

A more comprehensive understanding of the invention may be obtained by referring to the following illustrative examples which are not intended, however, to be unduly limitative of the invention.

*Example I*

A series of runs was carried out in which a cis-polybutadiene was compounded using variable amounts of a carboxy-terminated liquid polybutadiene as a processing aid. Control runs were also conducted in which no processing aid was used and in which a liquid polybutadiene was used as a processing aid.

The cis-polybutadiene employed in the runs was prepared by polymerizing 1,3-butadiene with a catalyst formed by mixing triisobutylaluminum, titanium tetrachloride and free iodine. The polybutadiene contained more than 95 percent cis 1,4-addition.

The liquid polybutadiene employed in preparing the carboxy-terminated polybutadiene was obtained by polymerizing 1,3-butadiene with a lithium-methyl naphthalene-isoprene-butadiene adduct. The polymerization was carried out in the presence of cyclohexane. After 100 percent conversion of monomer, the carbonation was carried out by contacting the polymer solution in a mixing T with excess carbon dioxide gas. The resulting carbonated solution was partially acidified with anhydrous hydrochloric acid and then stabilized with an antioxidant. The solution of carbonated polybutadiene was thereafter blended with a solution of non-functional polybutadiene, i.e., a polybutadiene that did not contain reactive end groups. The non-functional polybutadiene was prepared by polymerizing 1,3-butadiene with n-butyllithium in the presence of cyclohexane. The polymerization was terminated by adding anhydrous hydrochloric acid. The solution of the carbonated polybutadiene and the solution of the non-functional polybutadiene were blended so as to provide a blend containing carbonated polymer and non-functional polymer in a 3 to 1 weight ratio. The resulting blend was then completely acidified by adding additional anhydrous hydrochloric acid. The blend of carboxy-terminated liquid polybutadiene and non-functional liquid polybutadiene was recovered from solution by steam stripping. The blend had the following physical properties:

Carboxy content,[1] wt. percent _____ 1.17
Brookfield viscosity at 77° F., poises _____ 310

[1] Determined by titration with sodium methoxide using thymol blue as the indicator.

The liquid polybutadiene employed in the control run was prepared by polymerizing 1,3-butadiene with sodium. This polymer had a viscosity of 2500 centipoises at 100° F.

In preparing the compounded stocks, the ingredients were mixed for 7 minutes in a Banbury mixer and dumped at 280° F. or higher. They were then banded on a 6″ x 12″ mill at a roll temperature of 158° F. The recipes employed and the milling properties that were observed are shown below in the Table I.

free iodine. The polybutadiene contained more than 95 percent cis 1,4-addition.

The liquid polybutadiene employed as a processing aid in one of the control runs and also used in preparing the carboxy-terminated liquid polybutadiene was obtained by polymerizing 1,3-butadiene with a lithium-methyl-naphthalene-isoprene-butadiene adduct. The polymerization was carried out at a temperature between 120° and 150° F. in the presence of cyclohexane and tetrahydrofuran was added during the last half of the reaction. After 100 percent conversion of monomer, a portion of the polymer solution was carbonated in order to provide the carboxy-terminated liquid polybutadiene. Another portion of the polymer solution was treated with alcohol, and the non-functional liquid polybutadiene was recovered for use in one of the control runs. The carbonation was carried out by contacting the polymer solution in a mixing T with an excess of carbon dioxide gas. The resulting carbonated solution was acidified with anhydrous hydrochloric acid and then stabilized with an antioxidant.

In preparing each of the compoundeded stocks, the rubber, carbon black, processing aid, when used, and the chemicals except for the curatives (vulcanization agent and vulcanization accelerator) were added to a Banbury mixer. After mixing these ingredients for 1.5 minutes, oil preheated to 212° F. was added to the mixer. After a total mixing period of approximately 6 minutes, the Banbury mixer was dumped at a temperature of 300° F. Each batch was taken from the Banbury mixer to a 6″ x 12″ roll mill having a roll temperature of 158° F. An attempt was made to cause the batch to band with a distance between the rolls of 100 gauge (thousandths

TABLE I

| Run No. | 1 | 2 | 3 | 4 | 5 | 6 | 7 |
|---|---|---|---|---|---|---|---|
| cis-Polybutadiene | 100 | 100 | 100 | 100 | 100 | 100 | 100 |
| Carbon Black | 50 | 50 | 50 | 50 | 50 | 50 | 50 |
| Zinc Oxide | 3 | 3 | 3 | 3 | 3 | 3 | 3 |
| Stearic Acid | 2 | 2 | 2 | 2 | 2 | 2 | 2 |
| Philrich 5 [1] | 10 | 10 | 10 | | 10 | | |
| Pine Tar | | | | 10 | | 10 | |
| Butarez CTL [2] | 1 | 2 | 5 | 2 | | | |
| Butarez 15 [3] | | | | | | | 10 |
| Milling on 158° F. Mill: | | | | | | | |
| Max. Gauge | 50 | 75 | 100 | 100 | None | None | None |
| Band | [4] VLT | VLT | [5] T-LT | [6] T | None | None | None |
| Rating | 1 | 2 | 3 | 3 | 0 | 0 | 0 |

[1] Highly aromatic oil.
[2] Blend of carboxy-terminated liquid polybutadiene and a nonfunctional polybutadiene as described above.
[3] Sodium-catalyzed liquid polybutadiene.
[4] Very loose on top.
[5] Tight-Loose top.
[6] Tight.
[7] Rating 0 (no band) to 4 (best). A perfect milling material (4 rating) would band at mill gauge of 100 with a tight band to the rolls and a rolling bank.

The data in the foregoing table demonstrate that satisfactory milling was obtained when carboxy-terminated polybutadiene was used as a processing aid. When a processing aid was not employed, there was no banding on the mill. The use of a liquid polybutadiene as a processing aid had no effect on banding.

*Example II*

A run was carried out in which a cis-polybutadiene was compounded using a carboxy-terminated liquid polybutadiene as a processing aid. Control runs were also conducted in which no processing aid was used and in which non-functional liquid polybutadiene was used as the processing aid. The non-functional liquid polybutadiene employed in the latter run was a sample of the polymer that was carbonated in order to prepare the aforementioned carboxy-terminated liquid polybutadiene.

The cis-polybutadiene used in the runs was prepared by polymerizing 1,3-butadiene with a catalyst formed by mixing triisobutylaluminum, titanium tetrachloride and of an inch). If the particular stock did not band, the mill setting was reduced in increments of 25 until the stock banded or until the distance between the rolls was 25 gauge. In rating the ability of a stock to band, more value is placed on a stock that bands at the higher gauges.

After cooling, each stock was returned to the Banbury mixer for a 1.5 minute mix during which the curatives were added. The dump temperatures were between 200° and 230° F. Each stock was then taken from the mixer and placed on a 6″ x 12″ roll mill having a roll temperature of 125° F. The same procedure was then followed as described above in attempting to cause each stock to band.

The final remill was carried out on a cold roll mill with a gauge setting of 100. No attempt was made to reduce this gauge setting.

The recipes employed in the runs and the processing data obtained are shown below in Table II. In Run 1 the carboxy-terminated liquid polybutadiene of this invention was used as the processing aid. The non-functional liquid polybutadiene was employed as the processing aid in control Run 2 while in control Run 3 no processing aid was utilized.

TABLE II

| Run No. | 1 | 2 (Control) | 3 (Control) |
|---|---|---|---|
| cis-Polybutadiene | 100 | 100 | 100 |
| Carbon black | 50 | 50 | 50 |
| Zinc Oxide | 3 | 3 | 3 |
| Stearic Acid | 2 | 2 | 2 |
| Flexamine [1] | 1 | 1 | 1 |
| Butarez CTL [2] | 5 | | |
| Butarez [3] | | 5 | |
| Philrich 5 [4] | 10 | 10 | 15 |
| Sulfur | 1.75 | 1.75 | 1.75 |
| NOBS Special [5] | 1.1 | 1.1 | 1.1 |

PROCESSING DATA

| Milling Observations 158° F. Mill: [6] | | | |
|---|---|---|---|
| Gauge | 100 | 25 | 25 |
| Band | LT | LT | N |
| Bank | F | F | N |
| Mill Rating: [7] | | | |
| 158° F. Mill (0–4) | 3 | 1 | 0 |
| 125° F. Mill (0–4) | 2½ | 0 | 0 |
| Cold Mill (0–2) | 2 | 2 | 2 |
| Total (0–10) | 7½ | 3 | 2 |

[1] A physical mixture of a complex diarylamine-ketone reaction product (65%) and N,N'-diphenyl-p-phenylene-diamine (35%).
[2] Carboxy-terminated liquid polybutadiene. The polymer had a carboxy content of 1.89 weight percent and a Brookfield viscosity at 77° F. of 310.
[3] Non-functional liquid polybutadiene.
[4] Highly aromatic oil.
[5] N-oxydiethylene-2-benzothiazyl sulfenamine.
[6] The maximum gauge obtainable during the milling on the 158° F. rolls represents the maximum thickness (in thousandths of an inch) at which banding can be obtained. This property is a critical one in large-scale processing, a higher gauge being the most desirable. The code used for the "band" and "bank" observations is as follows:

| Band | Bank |
|---|---|
| T—Tight | R—Rolling |
| LT—Loose on top | F—Folding |
| BL—Band and loosen | N—None |
| N—None | |

A stock having the most desirable processing properties would have a tight band and rolling bank on a roll mill with a distance between rolls of 100 gauge.
[7] The mill rating is the sum of 3 rating figures, i.e., 0–4 for each of the observed performances on the 158° F. mill and 125° F. mill, and 0 to 2 on the cold mill. A perfect milling material would have a rating of 10.

The data in Table II demonstrate that the carboxy-terminated liquid polybutadiene of this invention materially improved the milling properties of the compounded stock. A comparison of the control runs indicates that the non-functional liquid polybutadiene resulted in little if any improvement in the processing properties.

*Example III*

A run was carried out in which a polybutadiene prepared with a lithium based catalyst was compounded using a carboxy-terminated liquid polybutadiene as a processing aid. Control runs were also conducted in which non-functional liquid polybutadiene was used as the processing aid and in which no processing aid was used. The carboxy-terminated polybutadiene and the non-functional liquid polybutadiene were the same as those described in Example II.

The polybutadiene used in the runs was prepared by polymerizing 1,3-butadiene in the presence of n-butyllithium. The polybutadiene product obtained had an inherent viscosity of about 2.40.

The procedure followed in preparing each of the compounded stocks was essentially the same as that described in Example II. However, the processing aids, i.e., the carboxy-terminated liquid polybutadiene and the non-functional liquid polybutadiene, were added to the Banbury mixer with the oil rather than with the carbon black and other chemicals. Processing data were determined in a manner similar to that described in Example II.

The recipes employed in the runs are the same as those shown in Table II of Example II except that the polybutadiene prepared with the n-butyllithium catalyst was used instead of the cis-polybutadiene. In Run 1 the carboxy-terminated liquid polybutadiene of this invention was employed as the processing aid. The non-functional liquid polybutadiene was used as the processing aid in control Run 2 while no processing aid was utilized in control Run 3. The processing data obtained are shown below in Table III.

TABLE III

| | 1 | 2 (Control) | 3 (Control) |
|---|---|---|---|
| Mill Observations 158° F. Mills: [1] | | | |
| Gauge | 100 | 50 | 25 |
| Band | LT | LT | T |
| Bank | F | F | F |
| Mill Rating: [1] | | | |
| 158° F. Mill (0–4) | 3 | 1 | 1 |
| 125° F. Mill (0–4) | 3 | 1 | 1 |
| Cold Mill (0–2) | 2 | 0 | 0 |
| Total (0–10) | 8 | 2 | 2 |

[1] See appropriate footnotes to Table II.

From the data in Table III, it is seen that the carboxy-terminated liquid polybutadiene greatly improved the milling properties of the compounded stock. The control runs show that no improvement in processing properties resulted from the use of the non-functional liquid polybutadiene.

As will be evident to those skilled in the art, many variations and modifications of the invention can be practiced in view of the foregoing disclosure. Such variations and modifications are believed to come within the spirit and scope of the invention.

I claim:
1. A rubbery composition of matter comprising a major portion of a blend of (1) a polybutadiene selected from the group consisting of (a) a cis-polybutadiene containing at least 85 percent cis-1,4-addition and (b) a polybutadiene prepared with a lithium based catalyst and (2) from 0.5 to 10 parts by weight of a carboxy-terminated liquid polybutadiene per 100 parts by weight of component (1), said carboxy-terminated liquid polybutadiene having a carboxyl content in the range of 0.5 to 5 weight percent.

2. In a method for improving the processability of a polymer selected from the group consisting of (a) a cis-polybutadiene having at least 85 percent cis-1,4-addition and (b) a polybutadiene prepared with a lithium based catalyst, the improvement which comprises admixing 100 parts by weight of said polymer with from 0.5 to 10 parts by weight of a carboxy-terminated liquid polybutadiene having a carboxyl content in the range of 0.5 to 5 weight percent, said mixing occurring at a temperature in the range of 40° F. to 400° F. for a period in the range of 0.5 to 20 minutes.

3. In a process for improving the processability of a polymer selected from the group consisting of (a) a cis-polybutadiene having at least 85 percent cis-1,4-addition and (b) a polybutadiene prepared with a lithium based catalyst, the improvement which comprises mixing a solution of said polymer in a liquid hydrocarbon with a solution of a carboxy-terminated liquid polybutadiene in a liquid hydrocarbon, the amount of said liquid polybutadiene in the resulting mixture being in the range of 0.5 to 10.0 parts by weight per 100 parts by weight of said polymer, said carboxy-terminated liquid polybutadiene having a carboxyl content in the range of 0.5 to 5 weight percent, said mixing occurring at a temperature in the range of 60° F. to 350° F.; thereafter removing said liquid hydrocarbon from said mixture; and recovering the polymer blend so prepared.

4. In a method for improving the processability of a polymer selected from the group consisting of (a) a cis-polybutadiene having at least 85 percent cis-1,4-addition and (b) a polybutadiene prepared with a lithium based catalyst, the improvement which comprises admixing 100 parts by weight of said polymer with from 0.5 to 10 parts by weight of a carboxy-terminated liquid polybutadiene having a carboxyl content in the range of 0.5 to 5 weight percent.

References Cited by the Examiner

UNITED STATES PATENTS

| 2,631,175 | 3/1953 | Crouch | 260—533 |
| 2,638,460 | 5/1953 | Crouch | 260—41.5 |
| 3,108,994 | 10/1963 | Zelinski | 260—94.7 |
| 3,135,716 | 6/1964 | Uraneck | 260—533 |

FOREIGN PATENTS

| 653,056 | 11/1962 | Canada. |

MORRIS LIEBMAN, *Primary Examiner.*

LESLIE H. GASTON, *Examiner.*